J. A. STOLTMAN.
COUPLING FOR AIR BRAKE PIPES.
APPLICATION FILED DEC. 9, 1919.
1,363,287. Patented Dec. 28, 1920.
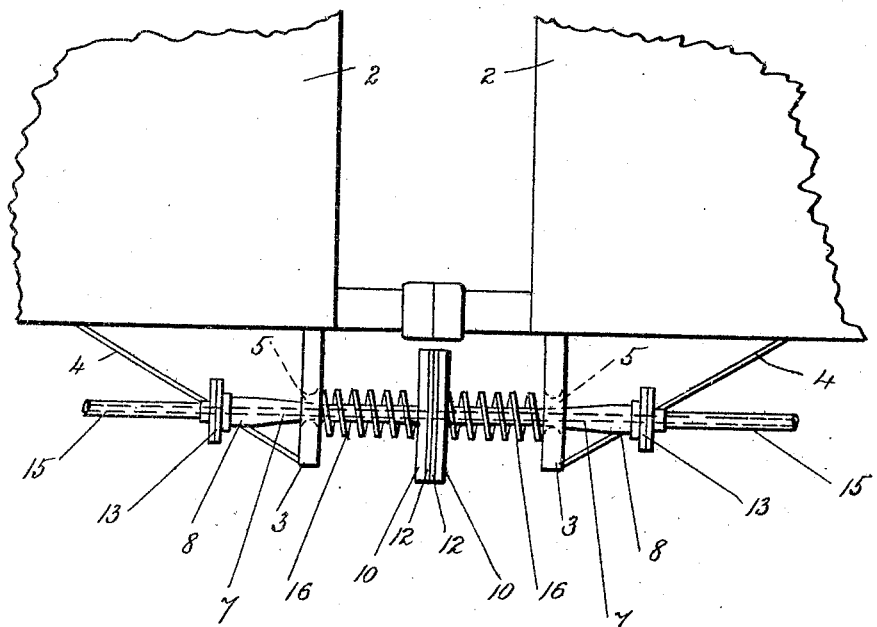
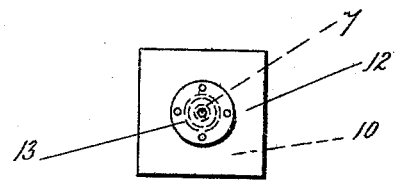
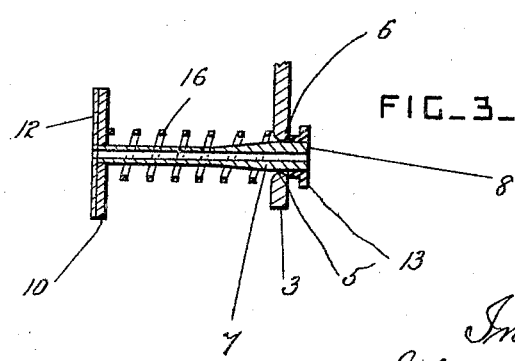
Inventor.
John A. Stoltman
by Herbert W. P. Jenner.
Attorney.

UNITED STATES PATENT OFFICE.

JOHN AUG. STOLTMAN, OF MINTO, NORTH DAKOTA.

COUPLING FOR AIR-BRAKE PIPES.

1,363,287. Specification of Letters Patent. Patented Dec. 28, 1920.

Application filed December 9, 1919. Serial No. 343,478.

*To all whom it may concern:*

Be it known that I, JOHN A. STOLTMAN, a citizen of the United States, residing at Minto, in the county of Walsh and State of North Dakota, have invented certain new and useful Improvements in Couplings for Air-Brake Pipes, of which the following is a specification.

This invention relates to couplings for the air brake pipes used on railroad trains; and it consists in the novel construction and combination of the parts hereinafter fully described and claimed.

In the drawings, Figure 1 is a side view of the coupling showing the cars coupled together. Fig. 2 is an end view of one of the coupling members. Fig. 3 is a section through a portion of one of the coupling members showing the position of the parts when the cars are uncoupled.

This pipe coupling is attached to the end portions 2 of two railroad cars of any approved construction which are connected together in any suitable manner. The end portion of each car has a strong vertical frame plate 3 secured to it and provided with suitable braces 4. Each frame plate 3 has a hole 5 in it, and the faces of the frame plates are normally arranged parallel to each other. The holes 5 are arranged in line with each other, and each hole has rounded edges 6.

A coupling tube 7 is arranged in each hole 5, and is tapered externally at one portion of its length, its thickest or largest portion 8 being arranged at one end portion, and adapted to fit the hole 5 so that the tube is held substantially horizontal. The end portions of the coupling tube are cylindrical, and the tapering portion between them tapers gradually so that it guides the large portion 8 into the hole 5. The adjacent and smaller end portions of the two tubes 7 have coupling plates 10 secured to them, and these plates have facings 12 of india rubber or other similar soft material. A coupling flange 13, or other connecting device is provided on the other end portion of each tube, and flexible air pipes 15 are secured to the flanges 13.

Strong helical springs 16 are provided and are arranged around the tubes between the frame plates and the coupling plates. When the cars are uncoupled, these springs project the tubes in the frame plates so that the larger end portions of the tubes fit the holes in the frame plate, and the tubes are supported in a substantially horizontal position, as shown in Fig. 3. When the cars are coupled together the tubes are pushed back in the frame plates, as shown in Fig. 1, so that the coupling plates are pressed tightly together by the helical springs, and the compressed air is prevented from leaking from between them by the facing plates of india rubber.

When the tubes are pushed back in this manner their smaller portions are in the holes of the frame plates, and the cars can be drawn along the rails and around curves without disturbing the contact of the coupling plates, as the frame plates are free to move pivotally in all directions on the smaller portions of the tubes, the holes in the frame plates being made large enough to provide for the maximum movements of the cars.

What I claim is:

1. In a coupling for air brake pipes, supporting frames provided with holes, air tubes having end portions of different size and gently tapering guide portions connecting the said end portions, the large end portions of said tubes being adapted to fit in the said holes and the small end portions being free to tilt pivotally in said holes, coupling devices on the adjacent ends of the small end portions of the tubes, and springs which force the tubes toward each other and hold the large end portions of them in engagement with the said holes when the coupling devices are not pressed together.

2. In a coupling for air brake pipes, supporting frames provided with holes, air tubes having end portions of different size and gently tapering guide portions connecting the said end portions, the large end portions of said tubes being adapted to fit in the said holes and the small end portions being free to tilt pivotally in said holes, flat coupling plates secured on the adjacent ends of the small end portions of the tubes, and springs which force the said coupling plates toward each other and hold the large end portions of the tubes in engagement with the said holes when the coupling plates are not pressed together.

In testimony whereof I have affixed my signature.

JOHN AUG. STOLTMAN.